INVENTOR
ROBERT J. NEBESAR
BY
Busser and Harding
ATTORNEYS

Sept. 28, 1954     R. J. NEBESAR     2,690,412
METHOD OF MAKING LIGHT-WEIGHT CORROSION RESISTANT TUBES
Filed Jan. 27, 1949     3 Sheets-Sheet 2
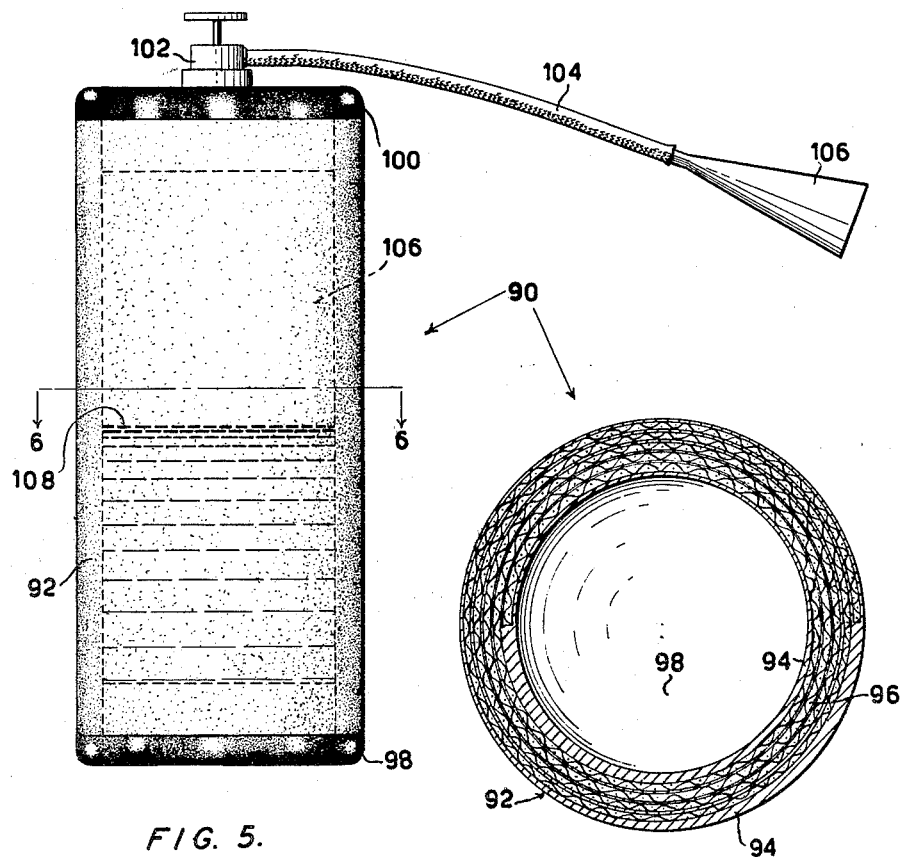
FIG. 5.
FIG. 6.
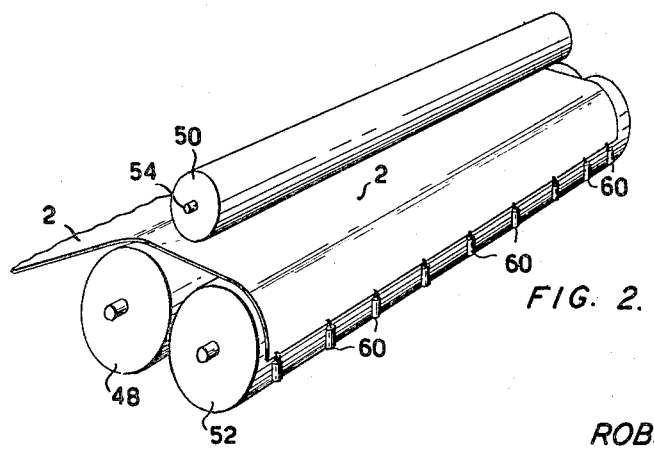
FIG. 2.
INVENTOR.
ROBERT J. NEBESAR
BY
ATTORNEYS Sept. 28, 1954  R. J. NEBESAR  2,690,412
METHOD OF MAKING LIGHT-WEIGHT CORROSION RESISTANT TUBES
Filed Jan. 27, 1949  3 Sheets-Sheet 3

INVENTOR.
ROBERT J. NEBESAR
BY
ATTORNEYS

Patented Sept. 28, 1954

2,690,412

UNITED STATES PATENT OFFICE 2,690,412

METHOD OF MAKING LIGHT-WEIGHT CORROSION RESISTANT TUBES

Robert J. Nebesar, Bristol, Tenn., assignor to Universal Moulded Products Corporation, Bristol, Va., a corporation of Delaware Application January 27, 1949, Serial No. 73,054

2 Claims. (Cl. 154—83)

This invention relates to a process for making tubes and the product of the process. It more particularly relates to the process of making a tube of substantially inert material impregnated with a synthetic resin and the product formed by the process.

The method in accordance with this invention provides a light-weight tube which has superior strength, a high resistance to corrosion, strongly resists delamination and may be translucent.

The tube formed in accordance with this invention comprises a substantially inert fabric impregnated with a synthetic resin forming plies or wraps which are connected by a thin layer of synthetic resin. Further, the interior of the tube is lined with a layer of synthetic resin and the exterior of the tube has a similar layer. In its preferred form the tube is translucent which is a marked advantage when it is desired to obtain a sight on a contained liquid, for example, to determine the liquid level.

The tube in accordance with this invention has, for example, been found to be superior to heretofore used pipes for carrying hot wet chlorine gas and hot sodium chloride brine saturated with chlorine. Again the tube is highly resistant to the corrosive chemicals found in refineries, such as, sulphur dioxide and nitric oxide, and may be substituted for the costly metallic pipes now in use.

It is an object of this invention to provide a light-weight corrosion resistant tube superior to those heretofore known.

It is a further object of this invention to provide a light-weight corrosion resistant tube which is capable of withstanding high internal and external pressures.

It is an additional object of this invention to provide a light-weight corrosion resistant tube which is not only of great strength but also translucent.

A still further object of this invention is to provide a method whereby a light-weight corrosion resistant tube of great strength can be made rapidly and without the use of high pressures.

An additional object of this invention is to provide a light-weight tube which is highly resistant to erosion.

An additional object of this invention is to provide a light-weight corrosion resistant tube of laminar structure which has a high resistance to delamination.

These and other objects of this invention will become apparent from the following description read in conjunction with the accompanying drawings, in which:

Figure 2 is a schematic view illustrating how the sheet is weighted prior to being rolled on the mandrel;

Figure 5 is an elevation of a fire extinguisher of the $CO_2$ type; and

Figure 6 is a section taken on the plane indicated by the line 6—6 in Figure 5.

Figure 1:
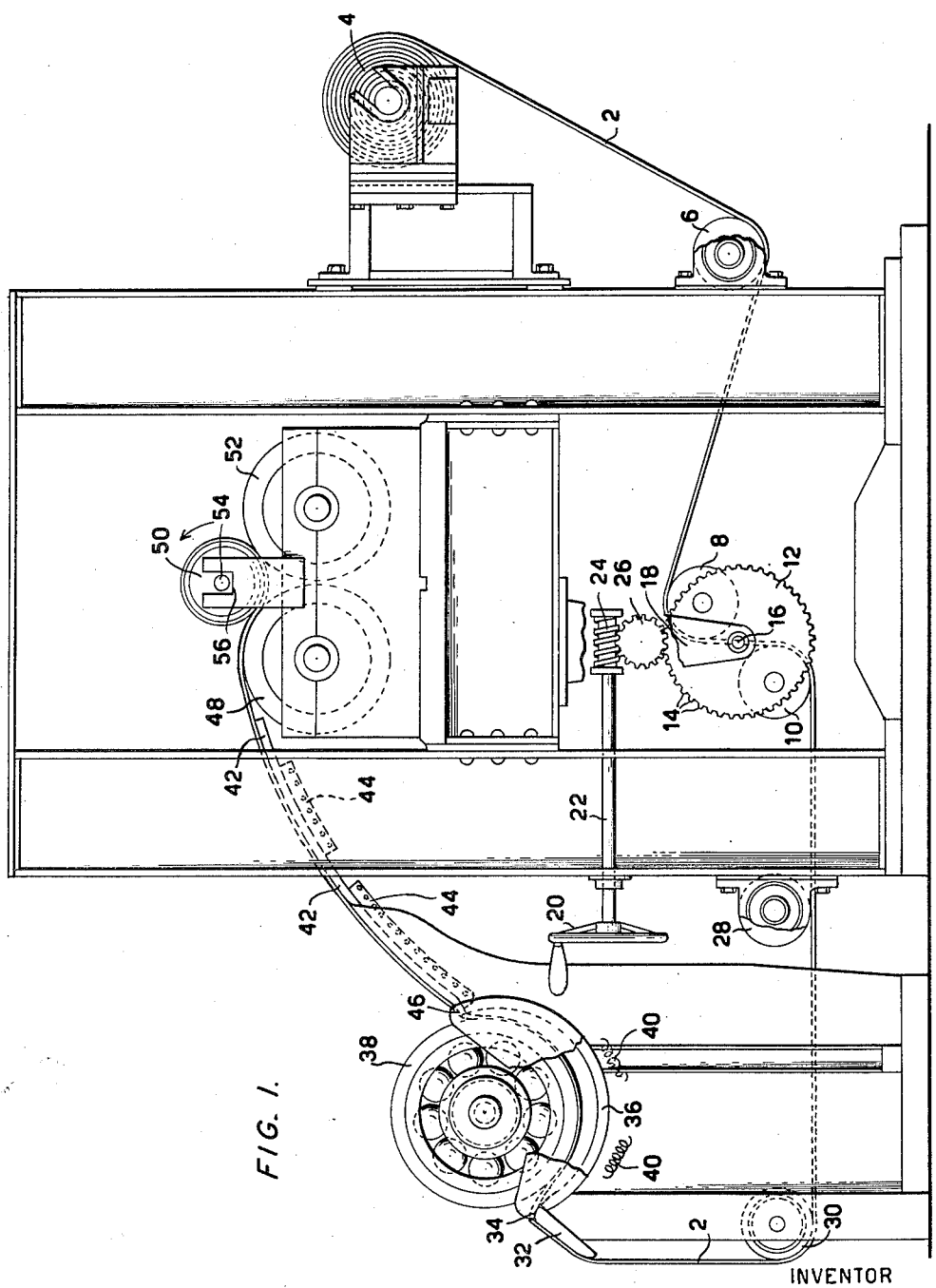
Figure 1 is a side elevation of exemplary apparatus which may be used to carry out the method in accordance with this invention.

The method comprises broadly forming a tube from a resin impregnated fabric. The tube is formed so that it will have a layer of resin separating each layer or wrap of resin impregnated fabric. Preferably the tube has, on both its inner and outer surfaces, a layer of resin.

The fabric used may be any woven fabric made from a substantially inert continuous filament, such as, for example, a glass fiber filament. Preferably the number of wefts will be about 20 to 80 per cent of the number of warps per square inch. Where the diameter of the tube is small, it is preferred to use thin fabric having, for example, a thickness of about .005 of an inch, while, for large diameters of tube, it is desirable to use cloth having a greater thickness, such as, for example, about .015 of an inch. Thus, for example, it has been found satisfactory in making a 6 inch diameter tube to use a continuous filament glass fiber fabric having the following characteristics:

.010 inch thick
8.70 ounces per square yard
32 warps and 21 wefts per square inch
Breaking strength of weft per inch of width, 290 lbs.
Breaking strength of warp per inch of width, 400 lbs.

It will, of course, be apparent that the specifications of the fabric may be varied within wide limits depending not only on the size of the tube but also upon the conditions to which the tube is to be subjected.

It is usually necessary to chemically treat the fabric prior to use in order to improve its wetting properties and eliminate preparations such as lubricants adhered to the fibers to facilitate their weaving. This may be done, for example, by burning them off. Such treatments are well known in the art. The wetting properties of glass fiber fabrics are known to be improved for example, by the use of a mixture of 1% methacrylic chrome complex, 97.5% water and 1½% neutralizing solution comprising 5% sodium formate, 0.2% formic acid and 94.8% water.

The synthetic resin may be any of the thermosetting or thermoplastic synthetic resins of the so-called low pressure type which may be cured by heat at low pressure. Where the dielectric properties of the tube are important, such synthetic resins, which are well known to have superior dielectric properties, will, of course, be selected. Similarly appropriate resins must be selected to resist the particular corrosive action to be encountered.

As exemplary of synthetic thermoplastic resins which may be used is dichlorostyrene. This resin is transparent and resistant to the action of chemicals.

As exemplary of synthetic thermosetting resins which may be used are a composition comprising a substantially linear polyhydric alcohol ester of an unsaturated polybasic acid material of the maleic type and a substituted-ethylene body of resin forming characteristics which is copolymerizable and miscible with the polyhydric alcohol ester. Thus, for example, the composition may be diethylene glycol maleate or diethylene glycol fumarate having incorporated therewith vinyl acetate, amylacrylate, or vinyl chloride. The curing of such a maleic substituted ethylene composition will be accelerated by using a curing catalyst such as benzoyl peroxide, phthalyl peroxide or air-blown dioxane. Such thermosetting resins are well known in the art and reference may be made to Patent 2,255,313, issued September 9, 1941, to Carleton Ellis for further information relative to them.

The steps in the method in accordance with this invention will be made apparent from a description of the method as carried out by the use of the apparatus shown in Figures 1 and 2, it being apparent that the apparatus disclosed in no manner limits the invention since it is obvious that the method may be performed by numerous other forms of apparatus. As shown in Figure 1, a fabric sheet 2 is fed from a supply roll 4. Sheet 2 passes under roller 6 and thence to tension rollers 8 and 10, it being noted that the sheet passes over roller 8 and under roller 10.

Rollers 8 and 10 are secured to a disc 12 which has gear teeth 14. Disc 12 is rotatably secured at 16 to bracket 18 and is adapted to be rotated by movement of the handle 20 through shaft 22, worm 24 and gear 26. Rollers 8 and 10 are similarly rotatably secured to a rotatable disc disposed oppositely to disc 12 (not shown). Rollers 8 and 10, together with the discs and the associated described mechanism, form a tension control mechanism commonly used in the art. It will be apparent that the more disc 12 is rotated counterclockwise as viewed in Figure 1, the greater the tension induced in sheet 2 will be.

After leaving roller 10, sheet 2 passes under roller 28 and roller 30 and thence to sloping plate 32. On passing over rounded portion 34 of plate 32, sheet 2 enters impregnating basin 36. Sheet 2 is guided through basin 36 by a roller 38. Basin 36 contains the impregnating resin, together, if necessary, with a suitable catalyst, the mixture being maintained in a heated liquid condition, say about 190° F. by means of heating coils 40 (shown schematically).

Sheet 2 leaves roller 38 and passes out of basin 36 onto curved plate 42 which is maintained at an elevated temperature, say about 190°, by means of heating coils 44. It will be noted that, on leaving basin 36, sheet 2 is necessarily flexed at 46. This flexing is highly desirable in that it implements the complete impregnation of the sheet with resin. During its passage over heated plate 42, the resin is given ample opportunity to fully soak or impregnate the sheet, the length of the plate being selected to achieve this end.

On leaving plate 42, sheet 2 passes over roller 48, between roller 48 and mandrel 50 and then between mandrel 50 and roller 52. Mandrel 50 is connected to a driving mechanism and drives rollers 48 and 52 frictionally.

Mandrel 50 will have a smooth surface, preferably a nickel or chrome plated surface. It will be noted that mandrel 50 is not forced downwardly except by its own weight. The weight of the mandrel is selected to exert a pressure against the two rollers of about ten pounds per inch of length. When the weight of the mandrel is insufficient to exert the desired pressure, added pressure may, of course, be exerted by conventional means such as by securing weight to the spindles or by the use of hydraulic rams. Thus cloth 2 is not subjected to the high pressures commonly used in forming tubes. This will be apparent from noting that roller 50 has spindles 54 which are supported in yokes 56, the spindles 54 not touching the bottoms of yokes 56.

In order to start rolling cloth 2 on mandrel 50, the cloth, as shown in Figure 2, is stretched across rollers 48 and 52, great care being taken to prevent the formation of any unevenness or folds in the cloth. Weights 60 are clamped to the end of the cloth to hold it in position while mandrel 50 is lowered.

Before mandrel 50 is lowered, it is coated with the selected synthetic resin, catalyzed or not as necessary, and the resin is permitted to become somewhat tacky. The mandrel is now lowered so as to rest on sheet 2 and rollers 48 and 52. Weights 60 insure that the sheet 2 is maintained straight and even during this operation. The mandrel having been lowered, weights 60 are removed and roller 50 is moved so as to position the leading edge of cloth 2 between mandrel 50 and roller 52 to insure that the leading edge is adhered to a mandrel 50. Roller 50 is now reversed. During the formation of the first wrap, the cloth or the sheet 2 on mandrel 50 will desirably be given an additional coating of resin. Sheet 2 is continued to be rolled onto mandrel 50 until the desired number of plies or wraps result.

The speed of rollers 48 and 52 must be carefully selected. The speed of the rollers and the length of plate 42 must be selected so as to provide adequate time for the resin to thoroughly impregnate the sheet 2 while it is travelling on plate 42. This selected speed, of course, will be varied by various factors, particularly the temperature at which the resin is maintained, the fluidity of the resin used and the mesh and thickness of the cloth used. As the sheet 2 is wound over previous wraps on mandrel 50, it causes contained air bubbles in the portion of the sheet being wrapped onto the mandrel to escape. The speed of rolling must be selected so that there will be sufficient time for the major portion of the air bubbles to escape before they are trapped by the next succeeding wrap. This prevents the completed product from having contained air bubbles of such size as would weaken the structure or make the pipe porous.

Although it will be apparent that the speed of rollers 48 and 52 will vary considerably depending upon various factors as discussed above, it has been found, for example, in the formation of smaller diameter tubes that a speed resulting in a linear travel of the sheet at a rate of about five to fifteen inches per minute is satisfactory.

It is also of importance that the tension of the cloth being fed to mandrel 50 be maintained at a proper value. The tension should be sufficient to insure that the cloth 2 will be wrapped tightly onto mandrel 50. However, the tension must not be sufficiently great to prevent the formation of a layer of resin between the succeeding wraps. Although it will be apparent that the tension will vary depending on the materials used, it has been found to be generally satisfactory to utilize a tension of about one pound per inch of width.

A major objective of the process is to form an intermediate layer of resin between each layer of impregnated fabric. The above discussed factors are also determined with this end in mind. The thickness of each resin layer is about .0005 inch.

When a desired number of wraps has been formed on mandrel 50, the sheet 2 is severed at the end of plate 42 with a knife and the unwrapped portion wrapped onto the mandrel 50. Mandrel 50 is lifted from rollers 48 and 52 by a gradual upward movement while it is still rotating. This insures a proper parting of the fabric from rollers 48 and 52. Thus, for example, it is desirable that the full weight of mandrel 50 be gradually lifted off rollers 48 and 52 so as to fully relieve these rollers of the weight of the mandrel at the completion of about one-half of a turn of mandrel 50. Where mandrel 50 is permitted to stop, it has been found to result in undesirable irregularities in the formation of the tube in that the portion of the tube between the mandrel and rollers 48 and 52 will not have the intermediate layers of resin between the impregnated cloth layers.

Mandrel 50 holding tube 62 is now removed to a suitable location for curing. As shown more clearly in Figure 4, mandrel 50 has a hollow interior 64 and exteriorly leading passages 66 and 68 which have, respectively, threaded plugs 70 and 72. In order to cure tube 62, plugs 70 and 72 are removed. A steam supply line is connected to passage 66 and a steam exhaust line is connected to passage 68 thus providing for a passage of steam through interior 64. Before steam is admitted, wrapper 74 which may be, for example, of cellophane and have perforations 75, is secured to the mandrel by tape 76. Overlying the wrapper 74 is a wrap 77 of paper, for example, kraft paper which serves as an insulator and absorbs the excess resin passing through the perforations in wrapper 74.

Steam at from about 212° F. to 220° F. is now supplied to circulate through mandrel interior 64 in order to cure the synthetic resin. It should be specially noted that the heat for curing is supplied, for example, to the inside of the tube rather than to the exterior of the tube as is the common practice. This results in the formation of a superior tube due to the pressure exerted on the tube by the expansion of the heated mandrel. It further insures that the interior surface of the tube will have an adequate coating of resin since the resin draws toward the source of the heat.

During the curing by the application of heat, the mandrel is rotated or oscillated to prevent the sagging of the cloth thus insuring formation of a uniform tube.

Figure 4:
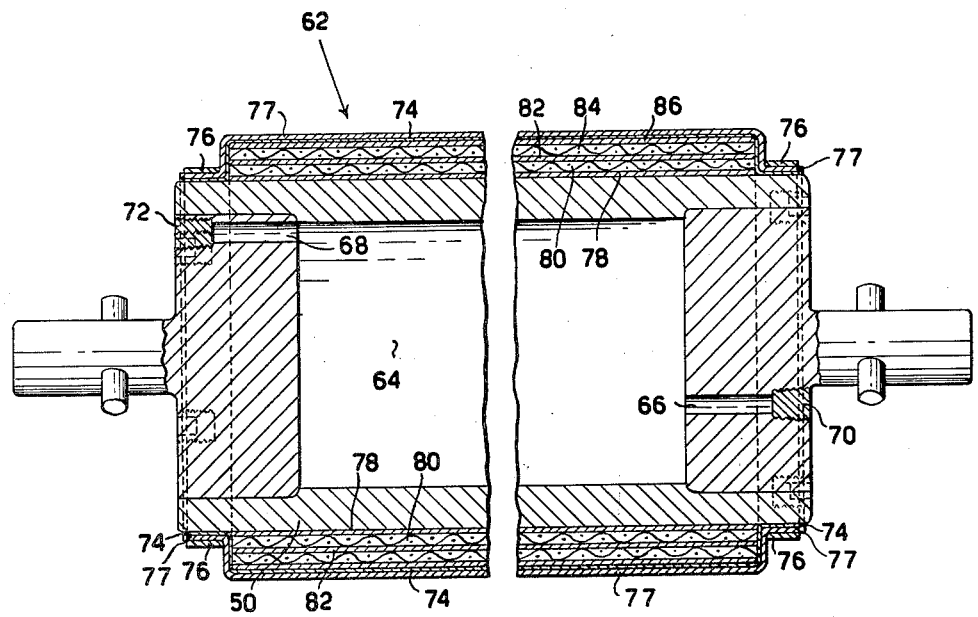
Figure 4 is a section taken on the plane indicated by the line 4—4 in Figure 3.
Figure 3:
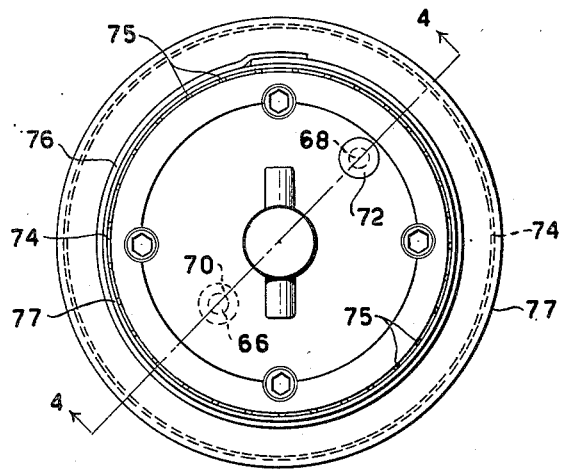
Figure 3 is an end view of a hollow mandrel carrying a tube formed in accordance with this invention.

As shown in Figure 4, the completed tube in accordance with this invention has an interior layer 78 of synthetic resin, a layer 80 of a woven fabric formed from a continuous glass fiber filament, a layer 82 of synthetic resin, a layer 84 of fabric formed from a continuous glass fiber filament and an external layer 86 of synthetic resin. The resin content of the completed tube is from 35% to 50% by weight of the tube. A resin content of under 35% by weight results in a porous tube which is easily delaminated.

The process is completed by removing air excluding cover 74 and by cooling mandrel 50 by, for example, passing cool water into passage 66 and draining it off by passage 68. The contraction on cooling of mandrel 50 permits the ready removal of tube 62.

The product formed in accordance with this method will, of course, be particularly useful as piping where corrosive materials are to be conducted or where the exterior of the piping is exposed to corrosive materials. It will, of course, be extremely useful where it is desired to form tubular bodies of great strength which are nonconductors and which are not subject to electrolytic action.

As specifically illustrating a use for a tubular body formed in accordance with this invention, a fire extinguisher 90 of the carbon dioxide type is shown in Figures 5 and 6. The fire extinguisher has a tubular main body portion 92 made in accordance with this invention. Main body portion 92, as shown in Figure 6, has alternate layers of synthetic resins 94 and resin impregnated continuous filament glass fiber fabric 96. It will be noted that the innermost and outermost layers are resin layers.

The synthetic resin is selected so that the main body portion 2 will be translucent. Thus diethylene glycol maleate having incorporated therewith vinyl acetate may be used. A molded cap 98 is secured to the bottom of main body portion 92; the cap 98 may be of a filler reinforced (fiberglass) synthetic resin and bonded to the main body portion by a synthetic resin layer. A cap 100, which may be formed from a filler reinforced (fiberglass) synthetic resin, is secured to main body portion 92 similar to the manner in which cap 98 is secured. A valve 102 is threaded to cap 100 and has a flexible tube 104 and a horn 106. The fire extinguisher 90 contains liquid carbon dioxide 106. It will be apparent that the level of the contained liquid may be observed through main body portion 92 as at 108.

As is well known in the art, opening of valve 102 permits the escape of carbon dioxide in the gaseous form through tube 104 and horn 106.

It will be apparent that, in addition to forming a fire extinguisher of exceptional strength, the composition of the main body portion 92, by permitting direct observation of the level of the contained liquid, greatly reduces the cost of inspecting such extinguishers, which is normally accomplished by weighing, and provides, in addition, a continuous check on the readiness of the fire extinguisher to fulfill its function.

What I claim and desire to protect by Letters Patent is:

1. The method of forming a tubular body which comprises passing a sheet woven from a continuous glass fiber filament into an impregnating bath of a low pressure synthetic resin, coating a smooth surfaced mandrel with a low pressure synthetic resin, rolling the impregnated sheet on said precoated mandrel at a linear rate of speed of from 5 to 15 inches per minute to permit the escape of entrapped gas from each wrap on the mandrel before the next successive wrap is formed, said sheet being maintained under tension, heating the mandrel internally to cure the tubular body and simultaneously exert pressure on the tubular body by expansion of the mandrel during the curing and rotating the mandrel during the curing to prevent sagging of the tubular body.

2. The method of forming a tubular body which comprises passing a sheet woven from a continuous glass fiber filament into an impregnating bath of a low pressure synthetic resin, flexing and slightly heating the impregnated sheet to facilitate complete impregnation thereof, said heating being insufficient to set the resin, coating a smooth surfaced mandrel with a low pressure synthetic resin, rolling the impregnated sheet on said precoated mandrel at a linear rate of speed of from 5 to 15 inches per minute to permit the escape of entrapped gas from each wrap on the mandrel before the next successive wrap is formed, said sheet being maintained under tension, heating the mandrel internally to cure the tubular body and simultaneously exert pressure on the tubular body by expansion of the mandrel during the curing and rotating the mandrel during the curing to prevent sagging of the tubular body.

References Cited in the file of this patent

UNITED STATES PATENTS

| Number | Name | Date |
| --- | --- | --- |
| 1,005,134 | Balliett | Oct. 10, 1911 |
| 1,010,088 | Subers | Nov. 28, 1911 |
| 1,455,359 | Schulthess | May 15, 1923 |
| 1,876,783 | Stadtfeld | Sept. 13, 1932 |
| 1,969,227 | Maclachlan | Aug. 7, 1934 |
| 1,974,211 | Freeman et al. | Sept. 18, 1934 |
| 2,076,729 | Kennedy | Apr. 13, 1937 |
| 2,186,442 | Youmans | Jan. 9, 1940 |
| 2,296,781 | Farny | Sept. 22, 1942 |
| 2,351,692 | Miller | June 20, 1944 |
| 2,383,733 | Parker | Aug. 28, 1945 |
| 2,424,315 | Hyatt et al. | July 22, 1947 |
| 2,467,999 | Stephens | Apr. 19, 1949 |
| 2,489,985 | Speight, Jr. | Nov. 29, 1949 |
| 2,500,573 | Rockoff | Mar. 14, 1950 |
| 2,525,070 | Greenwald et al. | Oct. 10, 1950 |
| 2,594,838 | Alexander et al. | Apr. 29, 1952 |
| 2,609,319 | Boge | Sept. 2, 1952 |